United States Patent [19]

Johansson

[11] 4,120,197

[45] Oct. 17, 1978

[54] DEVICE FOR SENSING EXERTED LOAD ON A ROPE, WIRE, OR THE LIKE

[75] Inventor: Kurt E. Johansson, Kiruna, Sweden

[73] Assignee: Ingenjörsfirman R. Öhrnell AB, Karlstad, Sweden

[21] Appl. No.: 859,101

[22] Filed: Dec. 9, 1977

[30] Foreign Application Priority Data

Dec. 16, 1976 [SE] Sweden ............................ 7614175

[51] Int. Cl.² ............................................. G01L 5/10
[52] U.S. Cl. ................................................ 73/144
[58] Field of Search ............................ 73/141 A, 144

[56] References Cited

U.S. PATENT DOCUMENTS

| | | | |
|---|---|---|---|
| 1,031,208 | 7/1912 | Thompson | 73/144 |
| 2,795,136 | 6/1957 | Matt | 73/144 |
| 3,260,106 | 7/1966 | Hull et al. | 73/144 |

FOREIGN PATENT DOCUMENTS 988,667 5/1951 France .................................. 73/141 A

*Primary Examiner*—Charles A. Ruehl
*Attorney, Agent, or Firm*—Flynn & Frishauf

[57] ABSTRACT

A device for sensing the exerted load on a rope, wire, or the like, comprises two mutually aligned wheels around which the rope or wire passes and a load sensor placed between the wheels. A clamping device connected to the load sensor is clamped to the rope or wire to divert the path of the rope or wire as it passes between the wheels. The load sensor comprises a roller connected to the clamping device and a shaft pivotally mounted within the roller by means of self-aligning bearings. A plurality of transducers are mounted to the shaft and the transducers are coupled to a means for indicating the load on the rope, wire, or the like as a function of a variation in the electrical characteristics of the transducer during bending of the shaft responsive to exertion of a load on the rope, wire, or the like.

12 Claims, 2 Drawing Figures

DEVICE FOR SENSING EXERTED LOAD ON A ROPE, WIRE, OR THE LIKE

This invention relates to a device for sensing exerted load on a rope, wire, or the like, which comprises two mutually aligned wheels which appropriately are grooved around their peripheral surfaces, a clamping device for the wire, or the like, and a load sensor placed between the said wheels and the said clamping device, the said sensor being arranged to transmit a signal which is a function of the sensed load to a display or presentation unit.

Prior art wire force measuring devices usually employ some form of spring to indicate by means of the reduced extension of the spring the magnitude of an exerted load on the wire. A frequently used wire force measuring device employs so-called cup springs.

Such prior art measuring devices have several disadvantages, for instance poor repetition accuracy in repeated measurements, a circumstance which in turn is due to the fact that the elasticity of the cup springs gradually deteriorates when a load is exerted for a prolonged period, and to the fact that the direction of load attack can vary slightly from case to case and with magnitude of the load exerted. A further disadvantage of springs is the poor accuracy when larger objects are involved.

One object of the present invention is to eliminate aforesaid and other disadvantages.

SUMMARY OF THE INVENTION

In accordance with the present invention, a device for sensing exerted load on a rope, wire, or the like comprises two mutually aligned wheels, the rope, wire, or the like passing around at least a portion of the peripheral surfaces of the wheels; a clamping device mounted between the wheels for clamping the rope, wire, or the like with its path diverted between the wheels; a load sensor placed between the wheels and connected to the clamping device; and load indicating means coupled to the sensor to indicate a load exerted on the rope, wire, or the like. The load sensor comprises a shaft, a roller, self-aligning means pivotally mounting the roller on the shaft at spaced apart positions on the shaft, the roller being mechanically connected to the clamping device, and a plurality of transducers mounted to the shaft. The transducers are arranged to produce an electrical quantity which is a function of the bending of the shaft in response to a load exerted on the rope, wire, or the like. The transducers are coupled to the load indicating means which indicates load as a function of the electrical quantity produced by the transducers.

DETAILED DESCRIPTION

Figure 1:
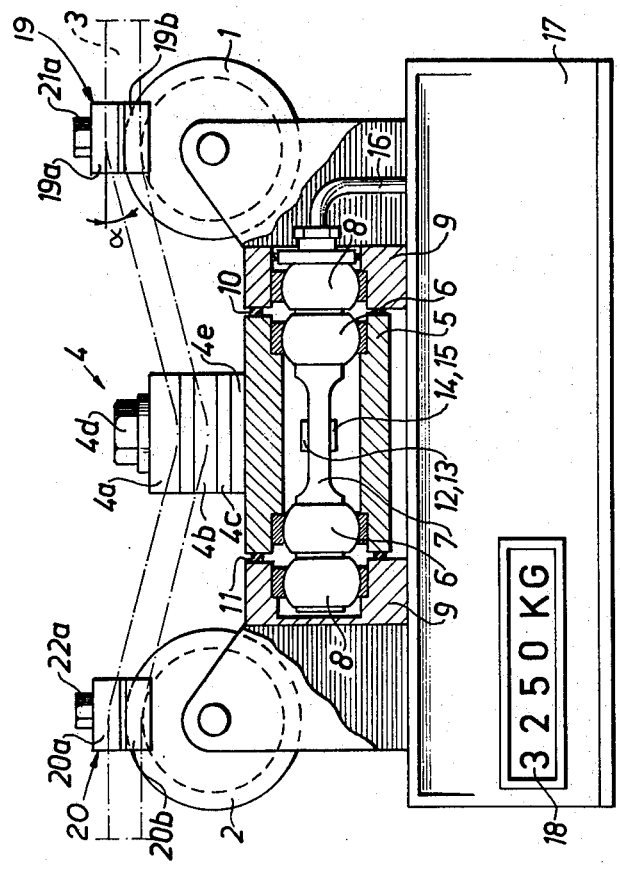
FIG. 1 shows a side view of the device according to the invention with certain parts cut open.
Figure 2:
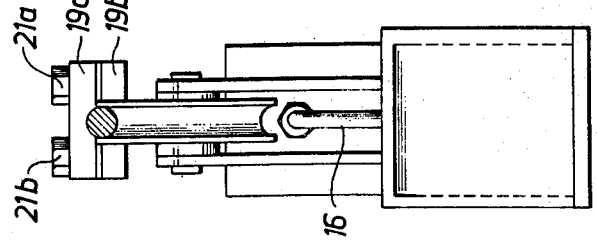
FIG. 2 shows an end view of the device according to FIG. 1.

The device according to the invention comprises two grooved wheels 1, 2 of which one can in applicable cases be moved out of position in a manner not shown. Running over part of the peripheral surfaces of wheels 1, 2 is a rope, wire 3, or the like, hereinafter referred to as a wire for convenience. The wire 3 is clamped in the slackened condition with the aid of a clamping member 4 which comprises a first grooved member 4a, a second grooved member 4b, spacers 4c, throughgoing screws 4d and a member 4e with not-shown threads with which screws 4d engage. The threaded member 4e is welded to the peripheral surface of a roller 5, which is mounted self-aligning via joint bearings 6 on a shaft 7 which via second joint bearing 8 is mounted self-aligning in relation to a frame 9. Seals 10, 11 are provided between the roller 5 and the frame 9.

The wire 3 can also be clamped at either or both wheels 1 and 2 by means of suitable clamps 19, 20 when it is desired to completely prevent wire turning from affecting the measuring result. Each clamp 19 and 20 respectively comprises a member 19b, 20b attached to wheel 1 or 2 respectively and a loose member 19a, 20a which clamps the wire 3 to the respective wheel 1 or 2 by means of screws 21a and 21b and 22 and 22b respectively.

The shaft 7 is provided in its central, reduced section with a plurality of transducers, for example in the direction of load exertion two 12, 13 on one side and two 14, 15 on the other side of the shaft 7. From the transducers 12–15 conductors run in a manner not shown through the shaft 7 and out from the end of shaft 7 by means of a cable 16 to an indicating and possibly processing unit 17.

The indicating and processing unit 17 can comprise a display section 18 to show the actual exerted load, a not-shown adjustable overload relay and a not-shown electronic system for conversion of the signals from transducers 12–15 to readable digits on display unit 18 and to trip an overload relay (not shown) if necessary. The entire device can be supplied either by batteries (not shown) housed in unit 17 or from an A.C. power source.

The transducers 12–15 may comprise wire strain gauges, the electronic system may include a Wheatstone bridge, in which the transducers such as strain gauges are connected in different branches, the bearings 6 and 8 may comprise self-aligning joint bearings or self-aligning articulated bearings and it should be observed that the measuring shaft 7 is floatingly mounted.

The device functions in the following manner. The wire 3, the load on which is to be measured or sensed, is placed between the wheels 1 and 2 and between parts 4a and 4b, an appropriate number of spacers 4c is arranged depending on the magnitude of the load to be measured and the screws 4d are then tightened. When a weight, for instance in the form of an overhead travelling crane which is to lift an object via the wire 3, exerts a load on the wire 3, the wire 3 endeavors to be straightened out between the wheels 1 and 2. Consequently, the wire 3 endeavors to pull member 4a upwards as seen in FIG. 1 and thereby a load is exerted on the shaft 7 via screws 4d, member 4e, roller 5 and bearings 6. When such a load is exerted on roller 5, the shaft 7 is slightly bent, in particular the section which is reduced, is slightly bent and since the transducers 12–15 are located on both sides of the shaft 7 in the aforesaid direction of application of the load, an output signal is obtained from each of the transducers 12–15 which is a function of (e.g., proportional to) the load exerted on wire 3. The said output signals from the transducers 12–15 are then added together, for instance in a Wheatstone bridge, and the resulting signal is then transmitted to the display unit 18 to display the actual load. An overload relay can also be provided in the unit 17 and if so is appropriately so connected that lifting of the object is stopped if the object is too heavy.

Since the roller 5 is carried on the shaft 7, self-centering of the load from the wire is obtained, thereby ensuring that the load exerted on the roller 5 from the wire 3 is always transmitted to the shaft 7 in one direction only.

Modification of the invention is obviously feasible within the scope of the accompanying claims.

I claim:

1. A device for sensing exerted load on a rope, wire, or the like, comprising:

two mutually aligned wheels (1, 2) having respective rope or wire retaining means around at least a portion of their peripheral surfaces, said rope, wire, or the like passing over at least a portion of each of said wheels and in engagement with said retaining means;

a clamping device (4) mounted between said wheels for clamping said rope, wire, or the like, with its path diverted between said wheels;

a load sensor placed between said wheels and connected to said clamping device (4) and;

load indicating means (16,17,18) coupled to said sensor to indicate a load exerted on said rope, wire, or the like;

said load sensor including a shaft (7), a roller (5), self-aligning means (6) pivotably mounting said roller (5) on said shaft (7) at spaced apart positions on said shaft, said roller (5) being mechanically connected to said clamping device (4), and a plurality of transducers (12-15) mounted to said shaft (7), said transducers (12-15) being arranged to produce an electrical quantity which is a function of the bending of said shaft (7) and being coupled to said load indicating means which indicates load as a function of said electrical quantity.

2. The device of claim 1, wherein said shaft (7), within the section where said transducers (12-15) are placed, has a smaller dimension in one load direction than the rest of the shaft.

3. The device of claim 2 wherein said transducers are mounted at a central portion of said shaft (7), taken in the longitudinal direction of said shaft.

4. The device of claim 1 wherein said transducers are mounted at a central portion of said shaft (7), taken in the longitudinal direction of said shaft.

5. The device of claim 1 wherein said self-aligning means comprises joint bearings (6).

6. The device of claim 5 wherein said joint bearings (6) are spaced along the length of said shaft (7) and said transducers are mounted at a point between said joint bearings (6).

7. The device of claim 1 comprising a frame (9) on which said wheels (1,2) are rotatably mounted and wherein said shaft (7) is attached via joint bearings (8) to said frame (9).

8. The device of claim 7 wherein said joint bearings (8) are mounted outboard of said self-aligning means (6) in the longitudinal direction of said shaft.

9. The device of claim 1 wherein said shaft (7) is placed parallel to said wire, rope, or the like.

10. The device of claim 1 wherein at least one of said wheels (1,2) includes a clamp (19,20) for clamping said wire, rope, or the like to the respective wheel.

11. The device of claim 1 wherein said clamping device (4) is rigidly connected to said roller (5).

12. The device of claim 1 wherein said rope or wire retaining means of said wheels comprises grooves around the respective peripheries of said wheels.

* * * * *